J. W. BODIE.
PUSH BAR.
APPLICATION FILED JUNE 3, 1911. RENEWED MAY 2, 1912.

1,030,639.

Patented June 25, 1912.

WITNESSES
INVENTOR.
Josiah W. Bodie
by James K. Polk
Attorney

UNITED STATES PATENT OFFICE.

JOSIAH W. BODIE, OF GREENWOOD, SOUTH CAROLINA.

PUSH-BAR.

1,030,639. Specification of Letters Patent. Patented June 25, 1912.

Application filed June 3, 1911, Serial No. 631,022. Renewed May 2, 1912. Serial No. 694,714.

*To all whom it may concern:*

Be it known that I, JOSIAH W. BODIE, a citizen of the United States, and a resident of Greenwood, in the county of Greenwood and State of South Carolina, have invented certain new and useful Improvements in Push-Bars, of which the following is a specification.

My invention relates to push-bars used in pushing railway-cars into and out of sidings, and along parallel tracks, and has for one of its objects the provision of a bar provided with cushions on its ends to relieve the shock to the car or cars.

Another object of my invention is the provision of a tubular bar made in two sections slidably mounted on one another and having an expansible coil-spring engaging the sections that also acts as a cushion and also causes the two ends of the bar to remain in contact with the car being pushed and the locomotive doing the pushing.

Another object of my invention is the provision of a signal in the bar and operated by the movement of one part of the bar on the other to give notice to the operators when the connection between the car and locomotive has been effected.

My invention will be described in detail hereinafter and illustrated in the accompanying drawings, in which—

Figure 1:
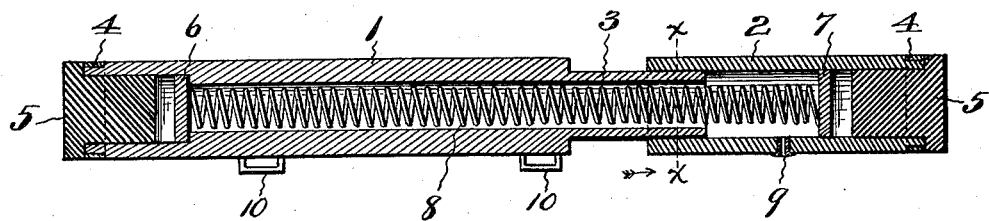
Figure 2:
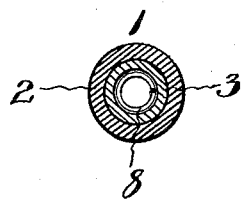

Figure 1 is a longitudinal sectional view of my improved push-bar; and Fig. 2, a cross-section on line *x x* of Fig. 1.

In the drawings similar reference characters will be used to designate corresponding parts throughout the several views.

The push-bar, as hereinbefore stated, and as shown in the drawings, consists of two parts 1 and 2, each of which are tubular, and part 1 is provided with a tubular plunger 3 that fits within the bore of parts 2. Parts 1 and 2 may be made of any suitable material, but I have found that the most desirable and effective material is hard wood, with the ends of the tubes provided with rings 4 to prevent chipping the abutting ends of the parts 1 and 2 and form seats for the cushions 5, secured on the outer ends of the two parts of the bar, said cushions being made preferably of soft rubber.

6 and 7 indicate air-tight partitions secured in parts 1 and 2, respectively, and 8 an expansible coil-spring mounted in parts 1 and 2 and tubular plunger 3 and secured to partitions 6 and 7, said spring 8 operating to keep the inner ends of the two parts remote from one another.

9 indicates a whistle secured in part 2 adjacent to partition 7 and adapted to be sounded by the air passing in and out of the interior of the bar when the two parts move relative to one another, the plunger 3 fitting part 2 air-tight so as to force air through the whistle when the parts 1 and 2 approach one another and draw it therethrough when the parts 1 and 2 are moved away from one another by expansion of spring 8.

10 indicates hand-holds to enable operatives to handle the bar conveniently.

In use the bar is placed against the car to be moved, and the locomotive that is to provide the power and as soon as the pushing force is sufficient to overcome the expansion of the spring 8 the whistle 9 is sounded by the air forced therethrough from the interior of the bar. As is well known, when the inertia of the standing car is overcome by the push from the locomotive, the first effect at times is to cause the car to start ahead of the locomotive, and unless the bar is held in position it will drop from engagement with the car and locomotive. To overcome this, the construction of the bar in two sections with the spring 8 to normally hold them apart, keeps the two ends of the bar in engagement with the car and locomotive and prevents it from dropping; also, that the spring 8, together with the cushions 5, absorbs the shock of the locomotive with the bar and car, and the car starts with little or no jar and vibration.

When the car moves more quickly than the locomotive, so that the adjacent ends of the parts 1 and 2 of the bar are moved away from one another the plunger 3 causes a suction in the bar and the air rushing through the whistle to equalize the pressure within and without the bar also causes the whistle to sound, and as the movements of the parts of the bar are substantially continuous the whistle will sound almost continuously as notice to operatives that the locomotive is connected to the car and the bar in operation.

Having thus described my invention, what I claim is—

1. In a push-bar for railway cars, the bar formed of two slidably engaging parts, and a signal on the bar that is operated by the movement of the parts of the bar relatively to one another, substantially as shown and described.

2. A push-bar for railway cars, formed in two slidably engaging parts, and a whistle on one section that is operated by the movements of the parts of the bar relatively to one another, substantially as shown and described.

3. A push-bar for railway cars formed in two parts slidably engaging one another, said parts being tubular and having air-tight connection, a spring connecting the two parts and normally tending to separate the parts, and a whistle on one of the parts adapted to be sounded by the escape and resumption of air-pressure within the bar caused by the movement of the parts on one another, substantially as shown and described.

4. A push-bar for railway cars formed of two tubular parts, a tubular plunger secured to one part and slidably engaging the bore of the other part, an air-tight partition in each part, an expansible coil-spring connecting said partitions, and a whistle on one part adapted to be sounded by the escape and resumption of air-pressure within the bar caused by the movement of the parts on one another, substantially as shown and described.

In witness whereof, I have hereunto set my hand in presence of two subscribing witnesses.

JOSIAH W. BODIE.

Witnesses:
J. W. SPENCE,
J. C. SELF.

---

Copies of this patent may be obtained for five cents each, by addressing the "Commissioner of Patents, Washington, D. C."